US011885898B2

(12) United States Patent
Billet et al.

(10) Patent No.: US 11,885,898 B2
(45) Date of Patent: Jan. 30, 2024

(54) METHOD FOR GEOLOCATING CONNECTED OBJECTS AND ASSOCIATED DEVICE

(71) Applicant: SAGEMCOM ENERGY & TELECOM SAS, Rueil Malmaison (FR)

(72) Inventors: Claire Billet, Rueil Malmaison (FR); Justine Lebrun, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 188 days.

(21) Appl. No.: 17/112,563

(22) Filed: Dec. 4, 2020

(65) Prior Publication Data

US 2021/0195376 A1 Jun. 24, 2021

(30) Foreign Application Priority Data

Dec. 19, 2019 (FR) ...................................... 1914889

(51) Int. Cl.
*G01S 5/02* (2010.01)
*H04W 4/029* (2018.01)
(Continued)

(52) U.S. Cl.
CPC ............ *G01S 5/02521* (2020.05); *G01S 5/06* (2013.01); *G06N 3/04* (2013.01); *G06N 3/08* (2013.01); *H04W 4/021* (2013.01); *H04W 4/029* (2018.02)

(58) Field of Classification Search
CPC ........ G01S 5/02521; G01S 5/06; G01S 19/01; H04W 4/029; H04W 4/021; G06F 18/241; G06N 3/04; G06N 3/08
See application file for complete search history.

(56) References Cited

U.S. PATENT DOCUMENTS

| 2011/0306354 A1* | 12/2011 | Ledlie ................... H04W 4/029 455/456.1 |
| 2015/0237471 A1* | 8/2015 | Li .......................... H04W 64/00 455/456.2 |
| 2020/0005523 A1* | 1/2020 | Brebner ............... H04B 17/318 |

FOREIGN PATENT DOCUMENTS

GB 2329801 A 3/1999

OTHER PUBLICATIONS

Javed Muhammad et al: "New Neural Network Based Mobile Location Estimation in a Metropolitan Area", 13 ao0t 2005 (Aug. 13, 2005), Artificial Neural Networks: Biological Inspirations—ICANN 2005; [Lecture Notes in Computer Science;;LNCS], Springerverlag, Berlin/Heidelberg, pp. 935-941, XP019014972 (Year: 2005).*

(Continued)

*Primary Examiner* — Umair Ahsan
(74) *Attorney, Agent, or Firm* — Williams Mullen; R. Brian Drozd

(57) ABSTRACT

A method for locating an object in a plane that includes a first so-called learning phase for informing a database, and a second so-called location phase, the location phase using a classifier operating using the database comprising information representing the transmission of signals between the object and antennas, for determining a probability of location of the object in zones of the plane, the location phase further using a neural network, for determining, for the zone of the plane for which the location probability is the highest, the position of the object in the form of coordinates in the plane. The invention also relates to a location device implementing the method.

9 Claims, 7 Drawing Sheets

(51) Int. Cl.
*G01S 5/06* (2006.01)
*G06N 3/04* (2023.01)
*G06N 3/08* (2023.01)
*H04W 4/021* (2018.01)

(56) References Cited

OTHER PUBLICATIONS

Aug. 31, 2020 Search Report issued in French Patent Application No. 1914889.
Ibrahim et al.; "CellSense: An Accurate Energy-Efficient GSM Positioning System;" IEEE Transactions on Vehicular Technology; vol. 61; No. 1; pp. 286-296; Jan. 1, 2012.
He et al.; "Towards Area Classification for Large-scale Fingerprint-based System;" Persuasive and Ubiquitous Computing, ACM; pp. 232-243; Sep. 12, 2016.
Muhammad et al; "New Neural Network Based Mobile Location Estimation in a Metropolitan Area;" Aug. 13, 2005.
Pampa Sadhukhan et al; "Performance analysis of clustering-based fingerprinting localixation systems;" Wireless Networks, ACM; vol. 25; No. 5; Feb. 8, 2018.

\* cited by examiner

METHOD FOR GEOLOCATING CONNECTED OBJECTS AND ASSOCIATED DEVICE

TECHNICAL FIELD

The invention relates to the field of the geolocation of devices indoors and outdoors. The present invention relates more particularly to the geolocation of devices transmitting radio signals to a network of antennas, the network of antennas having a heterogeneous antenna density.

PRIOR ART

Location techniques using a filtering by extended Kalman filter are known and use transmission levels and signal-to-noise ratio levels. These techniques are effective for geolocating objects that are fixed or not very mobile, but appear unsuitable for locating mobile objects, such as objects installed in vehicles for example.

Other location techniques are particularly well suited for performing the location indoors, in particular for locating objects connected to a wireless network of the Wi-Fi type. The document entitled "A deep learning approach to fingerprinting indoor localization solution" (L. Xiao, 2017) describes a method using such techniques, relying on a neural network and applied to a private network within a small area. This method is not suited to geolocation out of doors, for locating objects transmitting to potentially sparse antennas.

The patent application FR 3068141 describes another location method using Wi-Fi and an LPWAN network. This method is efficient with a dense mesh.

Finally, a so-called "fingerprinting" method exists, which uses a database composed of received signal level values coupled to real positions of an object. The position of an object to be located is estimated by comparison with the received signal level values recorded in the base. According to this method, the position in the base of data having the received signal level value closest to the received signal level coming from the object to be located is considered to be the position of the object. The location therefore attributes a position already listed, which may be distant from the true position.

These methods are not optimum for a location using a network of antennas with heterogeneous density and appear unsuited to geolocations outdoors. The situation can be improved.

DISCLOSURE OF THE INVENTION

The present invention aims in particular to optimise the precision of geolocation of an object transmitting signals to a network of antennas with a heterogeneous antenna density.

For this purpose, the object of the invention is to propose a method for locating an object in a plane, the object transmitting radio signals to a plurality of reception antennas positioned in the plane, the reception antennas each being combined with a reception device configured to deliver at least one item of information representing the transmission of said signals from the object to said antenna, the method comprising a learning phase, which comprises:

i) dividing the space into zones each comprising only one of the reception antennas, ii) recording, in a database, for each position among a plurality of known positions of the object in the plane, the at least one item of information representing the transmission of said signals from the object to each of the antennas, the position of the object in the form of coordinates in the plane, and an identifier of the zone, iii) optionally training a classifier to determine a probability of location of an object in each of the zones of the plane, and training a neural network to determine a location of an object in each of the zones of the plane A, from the information recorded in the database, the method further comprising a phase of geolocation of an object in the plane, which comprises:

iv) receiving radio signals from the object and through the plurality of antennas, and defining at least one item of information representing the transmission of signals from the object to each of the antennas, v) determining, by the classifier, from all the information representing the transmission of the signals between the object and each antenna, a probability of location of the object in each of the zones of the plane, vi) determining, by means of a neural network, for the zone for which the probability of location is the highest, the position of the object in the form of coordinates in the plane.

Advantageously, it is thus possible to define first of all a probability of presence of the object to be located in each of the zones defined by the division of the plane, and then to determine, by means of a neural network trained to do so, the location of the object in the zone in the form of coordinates in the plane. This two-step method makes it possible to obtain a more precise location of the object in the plane, quickly.

Another advantage lies in the fact that, when the probabilities of location in zones are not sufficiently discriminatory to "elect" a zone as distinctly having the strongest probability, a new iteration of the determination of the probabilities of location of the object in each zone can be reiterated, by use of the classifier, in order to increase the precision of the probabilities defined by zone.

The method for locating an object according to the invention may also comprise the following features, considered alone or in combination:

The division of the plane into zones is performed in accordance with a Voronoi diagram using a discrete set of points defined in the plane by the respective positions of the reception antennas.

The division of the plane into zones is performed in accordance with a so-called "watershed" segmentation method, a so-called "region growing" segmentation method or a so-called "k-mean" partitioning method.

The classifier uses a statistical learning method using a decision-tree forest.

The method is used for locating an object connected to a telecommunication network.

Another object of the invention is to propose a device for locating an object in a plane, the object transmitting radio signals to a plurality of reception antennas positioned in the plane, the reception antennas each being positioned in a predefined zone of the plane containing a single antenna and the antennas each being combined with a reception device configured to deliver at least one item of information representing the transmission of said signals from the object to said antenna, the location device comprising a database comprising, for each position among a plurality of known positions of the object in the plane, at least one item of information representing the transmission of said signals from the object to each of the antennas, the position of the object in the form of coordinates in the plane, and an identifier of a zone comprising said position among a plurality of zones of the plane, the location device comprising:
- a reception interface configured to receive at least one item of information representing the transmission of signals from the object to each of the antennas in the plurality of antennas,
- a classifier configured to determine, from all the information representing the transmission of the signals between the object and each antenna, a probability of location of the object in each of the zones of the plane,
- a neural network for determining, for the zone for which the probability of location of the object is the highest, the position of the object in the form of coordinates in the plane.

The device for locating an object according to the invention may also comprise the following features, considered alone or in combination:
- The classifier is configured to implement a statistical learning method using a decision-tree forest;
- The device comprises a neural network for each of the zones of the divided plane.
- The neural network or networks are characterised by an input vector size and an output vector size and comprise a dense layer composed of m neurones, m being a positive integer corresponding to half the sum of the size of the input vector and of the size of the output vector, the dense layer being fully connected, a dropout layer of 50% and an output layer of dimension two.

Another object of the invention is a computer program product comprising program code instructions for executing the steps of the method previously described when the program is executed by a processor, as well as an information storage medium comprising such a computer program product.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
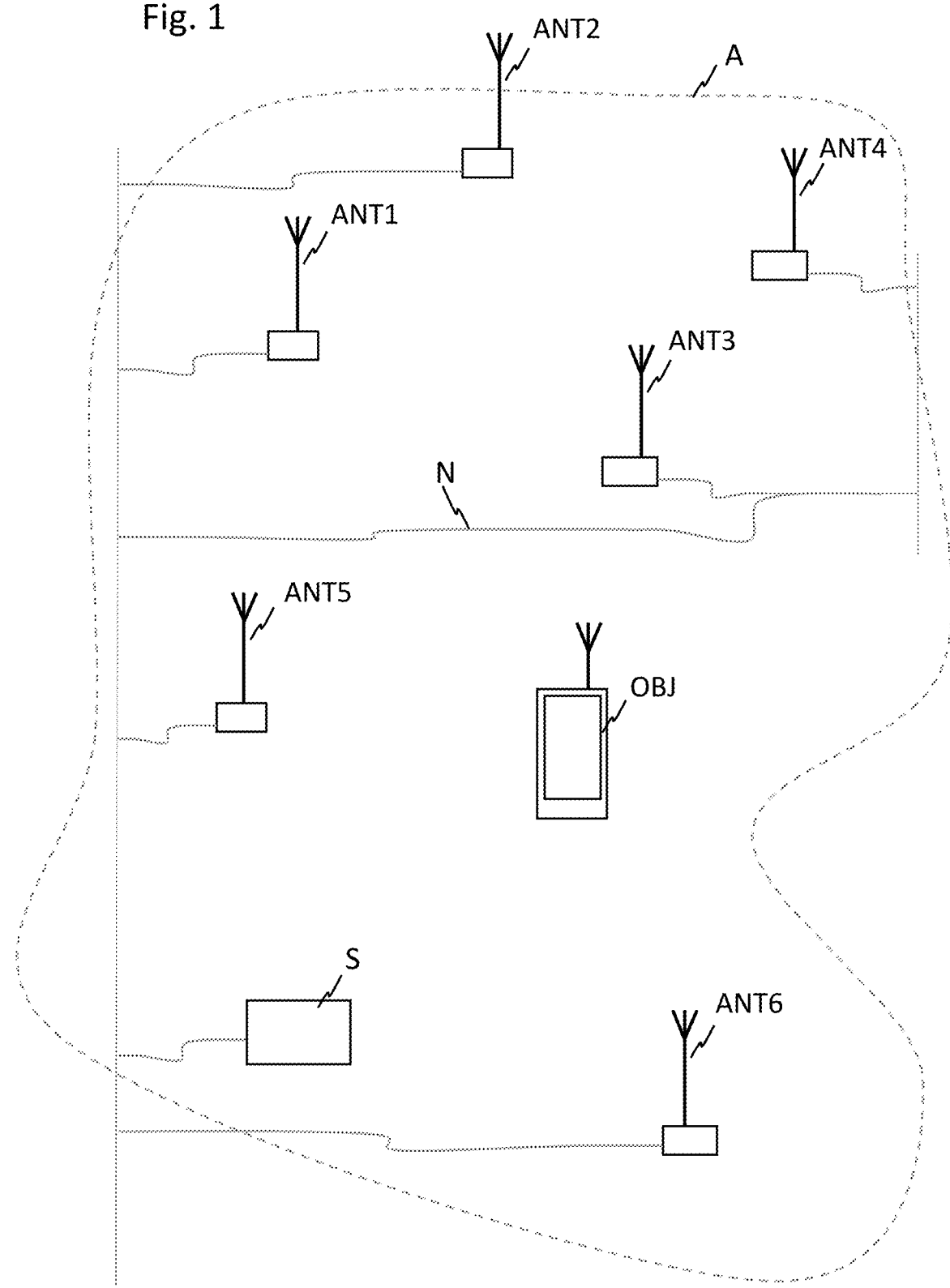
FIG. 1 illustrates a telecommunications network comprising a plurality of antennas distributed in one plane as well as an object to be located by a location device according to a particular and non-limitative embodiment of the invention.

FIG. 1 shows a plane A comprising a telecommunications network N using a plurality of telecommunication antennas ANT1, ANT2, ANT3, ANT4, ANT5 and ANT6 configured for receiving radio signals transmitted from the plane A or for transmitting radio signals towards any point on the plane A. The term plane is to be interpreted as a planar or quasi-planar space. Thus the plane A may correspond for example to a territory such as a plot of land, a town, a set of towns, a county or a region, these examples being non-limitative.

According to this configuration, one antenna among the antennas ANT1 to ANT6 does not necessarily cover the whole of the plane A, but the antennas ANT1 to ANT6 together cover the whole of the plane A. In the following description, no consideration is given to the phenomena of propagation of the waves and interference generally encountered because of relief or the presence of obstacles, and it is therefore considered that each antenna may receive radio signals from any point on the plane A (also referred to as a position), even if the amplitude of the signals seen from an antenna is considered to be zero or the arrival time of the signal cannot be defined.

Each of the antennas ANT1 to ANT6 is connected to a device itself connected to a telecommunications network N so that the radio signals received by an antenna can be processed by the connected device linked to this antenna and so that one or more items of information representing the transmission of radio signals received by an antenna can be transmitted by means of the telecommunications network N. A location device S is also connected to the telecommunications network N. The device S is configured to perform a location of an object OBJ present in the plane A. The object OBJ is an object connected to the telecommunications network N by means of one or more antennas among the antennas ANT1 to ANT6. The object OBJ is for example a smartphone, a location terminal, a smart watch, a so-called "smart" electronic device, a connected electricity meter, or a vehicle, these examples obviously not being limitative. The object OBJ is more broadly any object able to emit radio signals that can be captured by one or more of the antennas ANT1 to ANT6, the radio signals being able to be converted into one or more items of information representing the transmission thereof between the object OBJ and the antenna or antennas receiving these radio signals. According to the example described, six antennas cover the plane A and have a heterogeneous distribution density in the plane A.

The device S is configured for executing the method according to the invention, which comprises a learning phase and a location phase. The location phase allows location of the object OBJ or of an object similar to the object OBJ, at the end of the learning phase. The learning phase requires a division of the plane A into a plurality of zones, also referred to as cells. During the learning phase, the location device S records in a database one or more of the characteristics representing the transmission of radio signals from one or more objects OBJ, from known real positions. The term "real position" is to be interpreted as designating a position measured by means of a measurement system, such as a GPS device, for example, in contradistinction to an estimated position. For a given position of an object, considered for the learning phase, the characteristic or characteristics recorded are associated with the real position of the database, as well as information representing the zone in which the position that is the subject of a measurement to be recorded is situated (in the form of a sample in the base). The database of characteristics is preferentially included in the location device S. According to a variant, the database may be implemented in another device connected to the telecommunications network N, or to another network connected to the telecommunications network N, this location however having the drawback of adding additional processing times for informing or consulting the database using the location device S.

Figure 2:
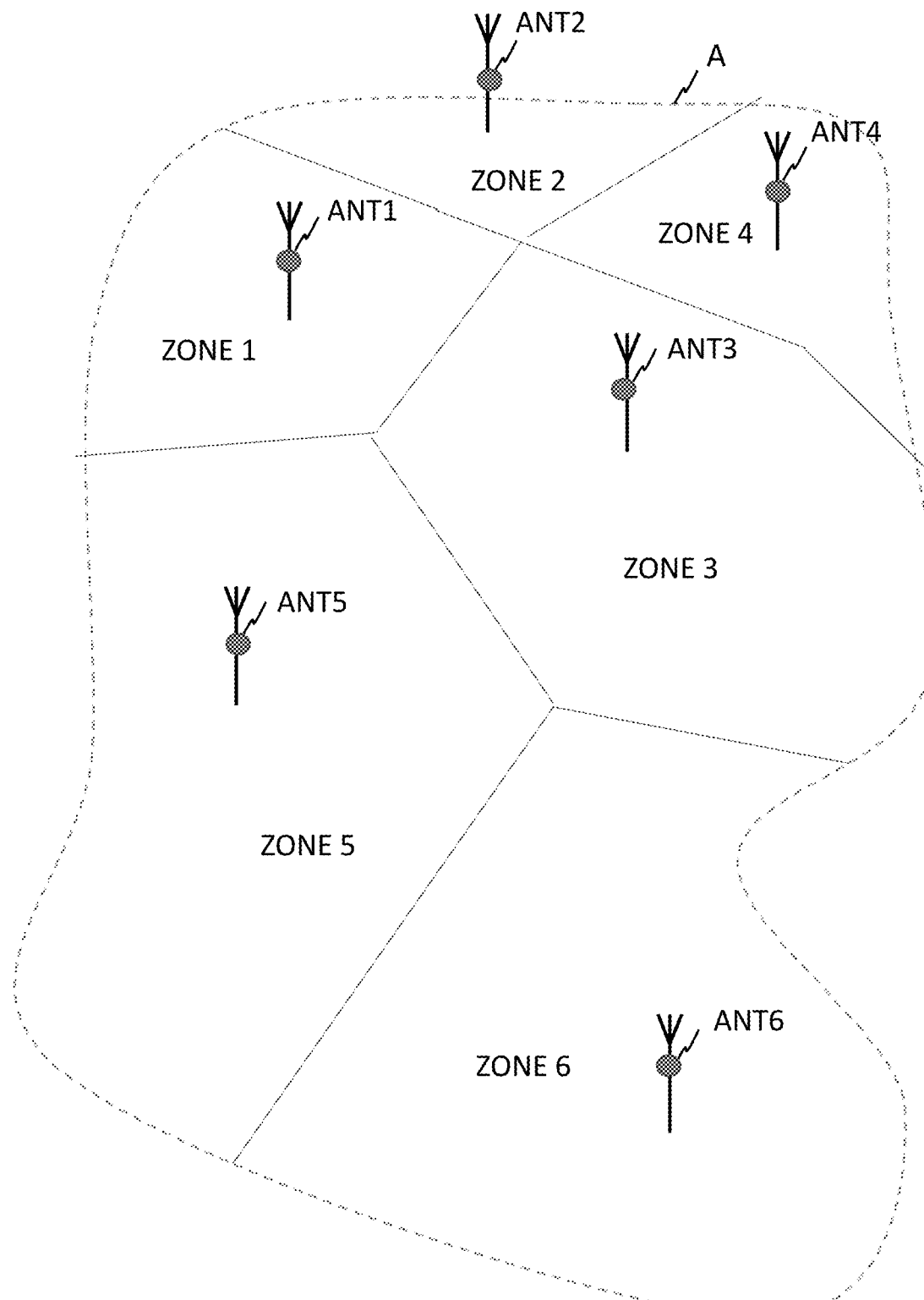
FIG. 2 illustrates a division of the plane already depicted in FIG. 1 into a plurality of zones each comprising an antenna.

FIG. 2 illustrates a division of the plane A into a plurality of zones ZONE1, ZONE2, ZONE3, ZONE4, ZONE5 and ZONE6 by a division method in accordance with the Voronoi algorithm. According to the preferred embodiment of the invention, the plane A is divided into a plurality of zones according to this algorithm. A Voronoi diagram is a space divided into cells each containing a point, so that each place in this cell is closer to the point that is situated in that cell than all the other points in the other cells. The boundaries of the cells represent the locations equidistant from two points or more. It is then considered that a cell is the zone of influence of a point. Thus the Voronoi division method applied to the plane A comprising the plurality of antennas ANT1 to ANT6 defines the zones ZONE1 to ZONE6, each comprising an antenna, and for which each place in a zone is closer to the antenna situated in this zone than any other antenna. The choice of the division method according to the Voronoi algorithm is not limitative and the division may, according to variants, be performed in accordance with another division or segmentation method. The division of the plane into zones may, for example, be performed in accordance with a so-called "watershed" segmentation method, a so-called "region growing" segmentation method or a so-called "k-mean" partitioning method.

Figure 3:
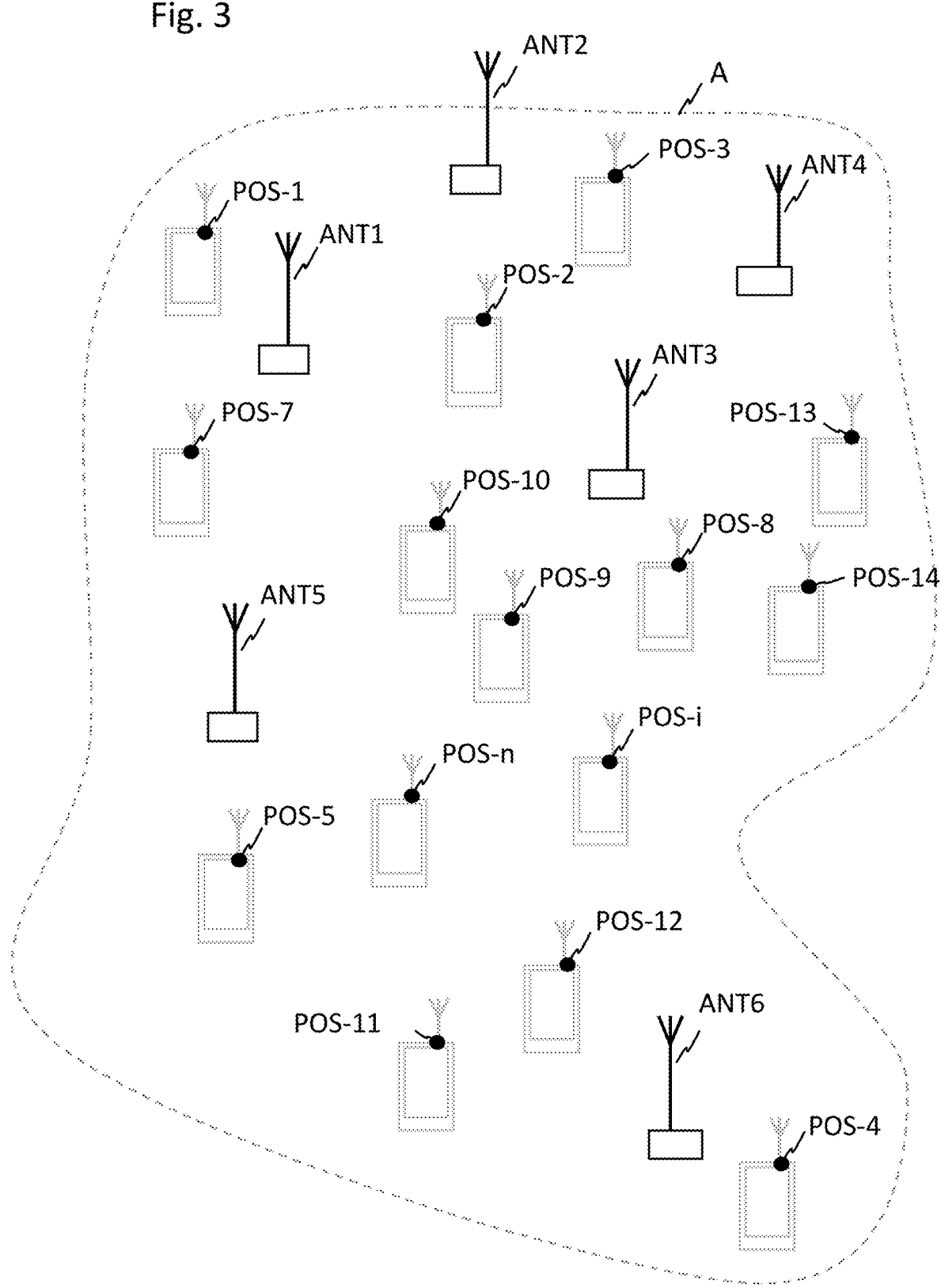
FIG. 3 illustrates known positions of one or more objects in the plane already depicted in FIG. 1 and FIG. 2, used by the device according to the invention, for performing a learning phase.

Real positions POS-1, POS-2, . . . POS-i, . . . POS-n are used for the learning phase. These n real positions are shown in FIG. 3, which shows as many objects OBJ as there are real positions, distributed in the plane A, among the antennas ANT1 to ANT6. The n positions may correspond equally well to successive positions of the same object OBJ or to different positions of similar objects OBJ.

Figure 4:
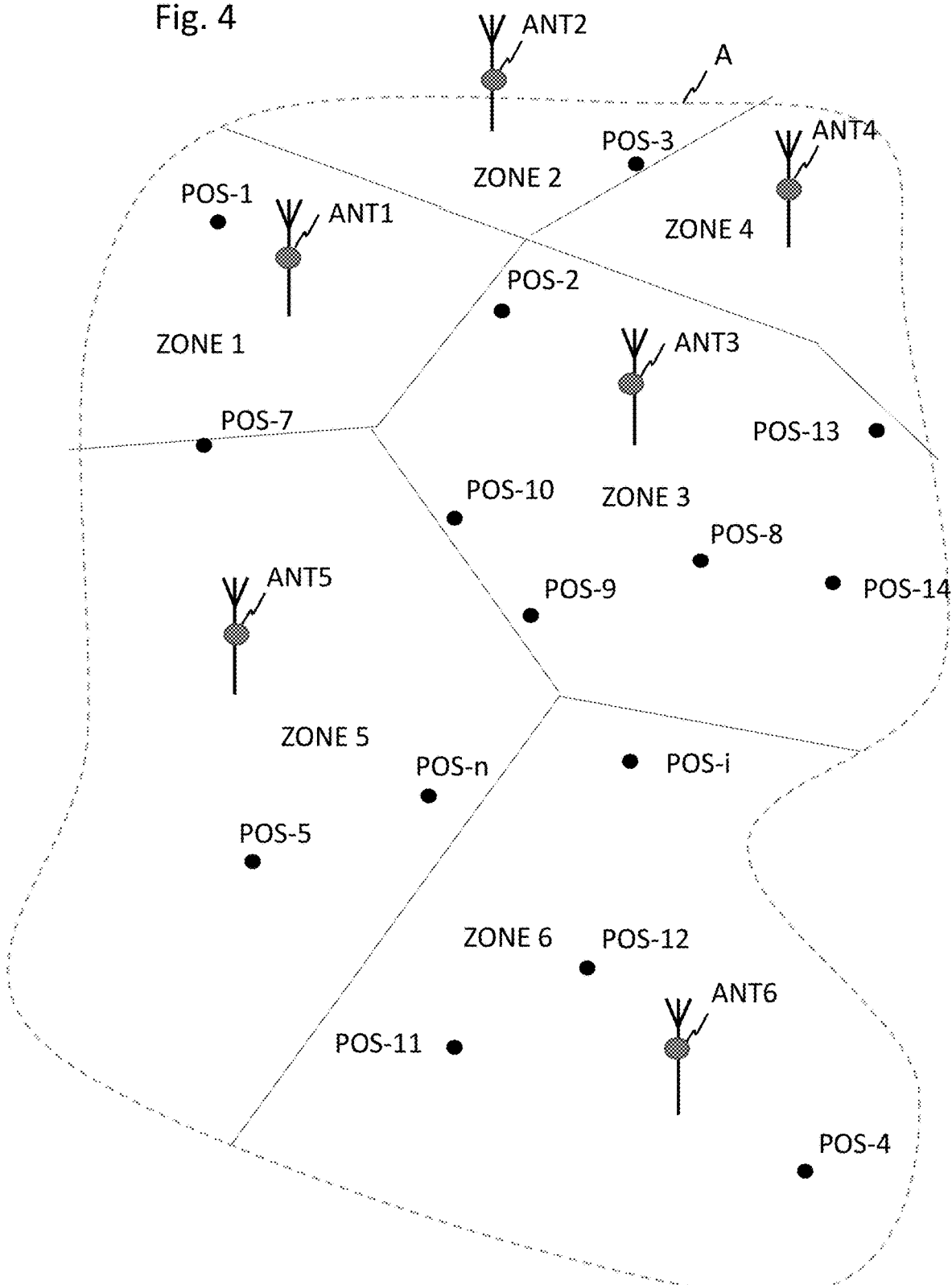
FIG. 4 shows the distribution of known positions of one or more objects, in each of the zones, for illustrating the learning phase of the device according to the invention.

According to a preferred embodiment of the invention, two parameters representing the transmission of radio signals between an object OBJ positioned at a position POS-i and each of the antennas among the antennas ANT1 to ANT6 are recorded in the database during the learning phase, at the same time as coordinates X and Y of the position POS-i and an identifier of the zone of the plane A wherein the position POS-i is situated. According to the preferred embodiment of the invention, the two parameters recorded in the base, representing a transmission between an object OBJ, from a real position POS-i, and an antenna from among ANT1 to ANT6, are the RSS (received signal strength) and the TDOA (time difference of arrival), and X and Y are the longitude and latitude of a position POS-i, all determined by a location device of the GPS type. The zone in which the POS-i is situated is determined by comparison of the coordinates with the Voronoi diagram, which is calculated from the form of the plane A and from the positions of the antennas ANT1 to ANT6 in the plane A. FIG. 4 illustrates the distribution of the real positions POS-1 to POS-n in the plane A, by zone. The real positions POS-1 to POS-n are distributed in the zones ZONE1 to ZONE6 in accordance with the Voronoi diagram calculated from the form of the plane A and from the location of the antennas ANT1 to ANT6. According to the distribution, the real positions POS-1 and POS-7 are situated in the zone ZONE1, the position POS-3 is situated in the zone ZONE 2, the real positions POS-2, POS-8, POS-9, POS-10, POS-13 and POS-14 are situated in the zone ZONE 3, etc. as illustrated in FIG. 4.

Figure 5:
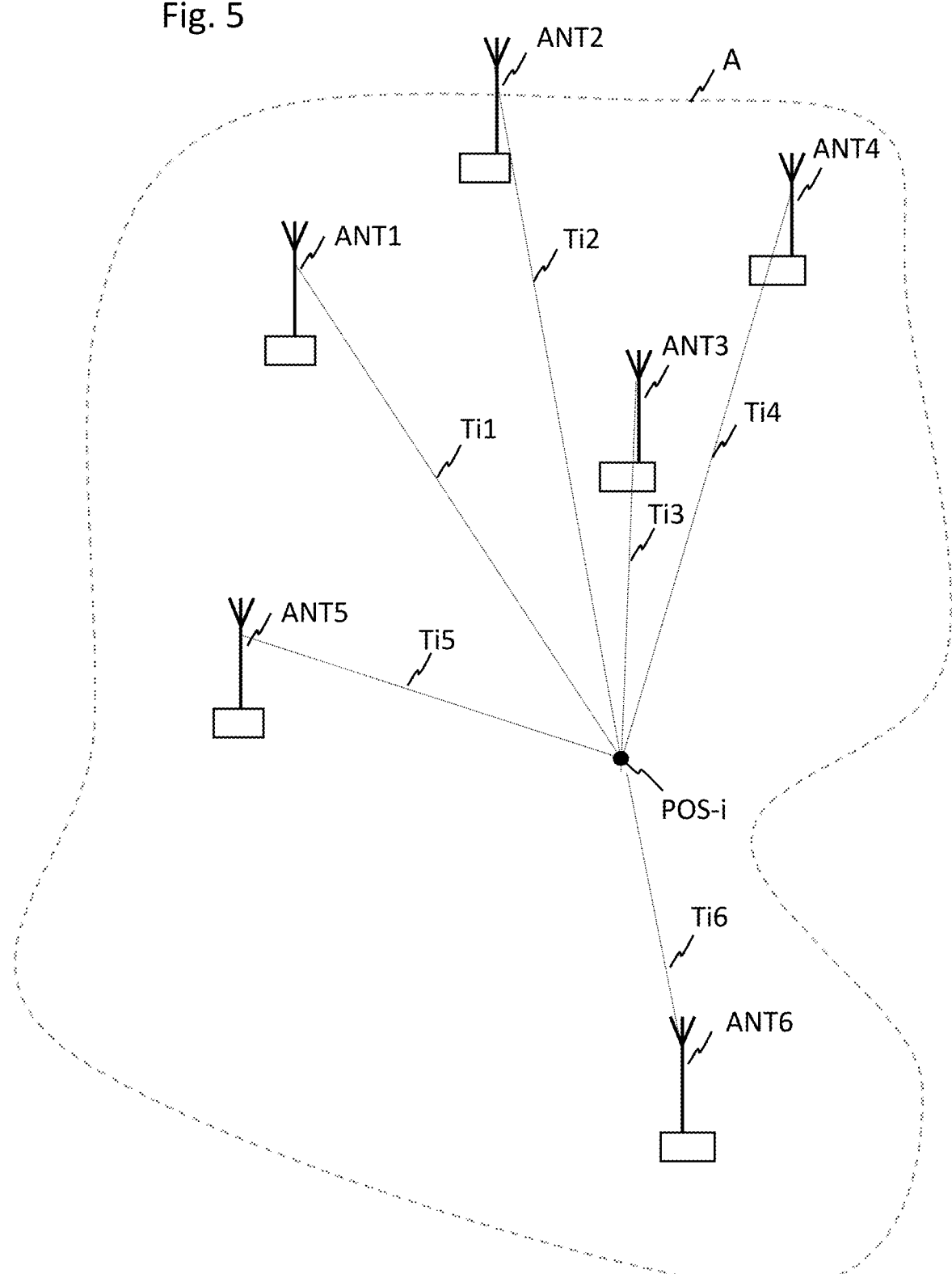
FIG. 5 is a schematic representation of a transmission of radio signals, from an object to be located to each of the antennas in the plane.

FIG. 5 illustrates a recording in the database of the location device S, during a learning phase, for a position POS-i of an object OBJ situated in the plane A. The object OBJ transmits radio signals that are received by each of the antennas ANT1 to ANT6. Thus it is possible to characterise the position POS-i by information representing the transmission of the radio signals between the object OBJ and each of the antennas ANT1 to ANT6. A transmission of electrical signals between the object OBJ located in the position POS-i to the antenna ANT1 is named transmission Ti1. In a similar fashion a transmission of electrical signals between the object OBJ located in the position POS-i to the antenna ANT2 is named Ti2. More broadly, a transmission of electrical signals between the object OBJ located in the position POS-i to the antenna ANTj is named transmission Tij. During the learning phase and for each recording of a real position in the base, the measured RSS level, the measured TDOA, the coordinates X and Y recorded by GPS (Global Positioning System) and an identifier of the zone comprising the position POS-i that is the subject of the measurement are, for each of the antennas, recorded so as to constitute together a sample representing the transmission Tij in the database of the location device S (i being a position index of the object and j being an index representing an antenna).

A learning phase comprises the recording of all the real positions able to be represented in the database. Thus, for each position POS-i in the positions POS-1 to POS-n, a recording is performed, for each of the antennas among the antennas ANT1 to ANT6, in accordance with the operating method previously described, and the base therefore comprises n×k recordings if n is the number of positions and k is the number of antennas. The learning phase further comprises an optional training of the classification algorithm of the RFCM classifier, as well as the training of the neural networks NN, for each of the zones ZONE1 to ZONE6 of the divided plane A. When these supervised learning models are trained (machine learning), the algorithms executed establish the parameters minimising the cost function for each of the models. The function makes it possible to measure the performance of the models implemented.

According to one embodiment of the invention, the RFCM classifier is static and operates without training. According to a variant, the RFCM classifier is configured to operate after a training phase.

Figure 6:
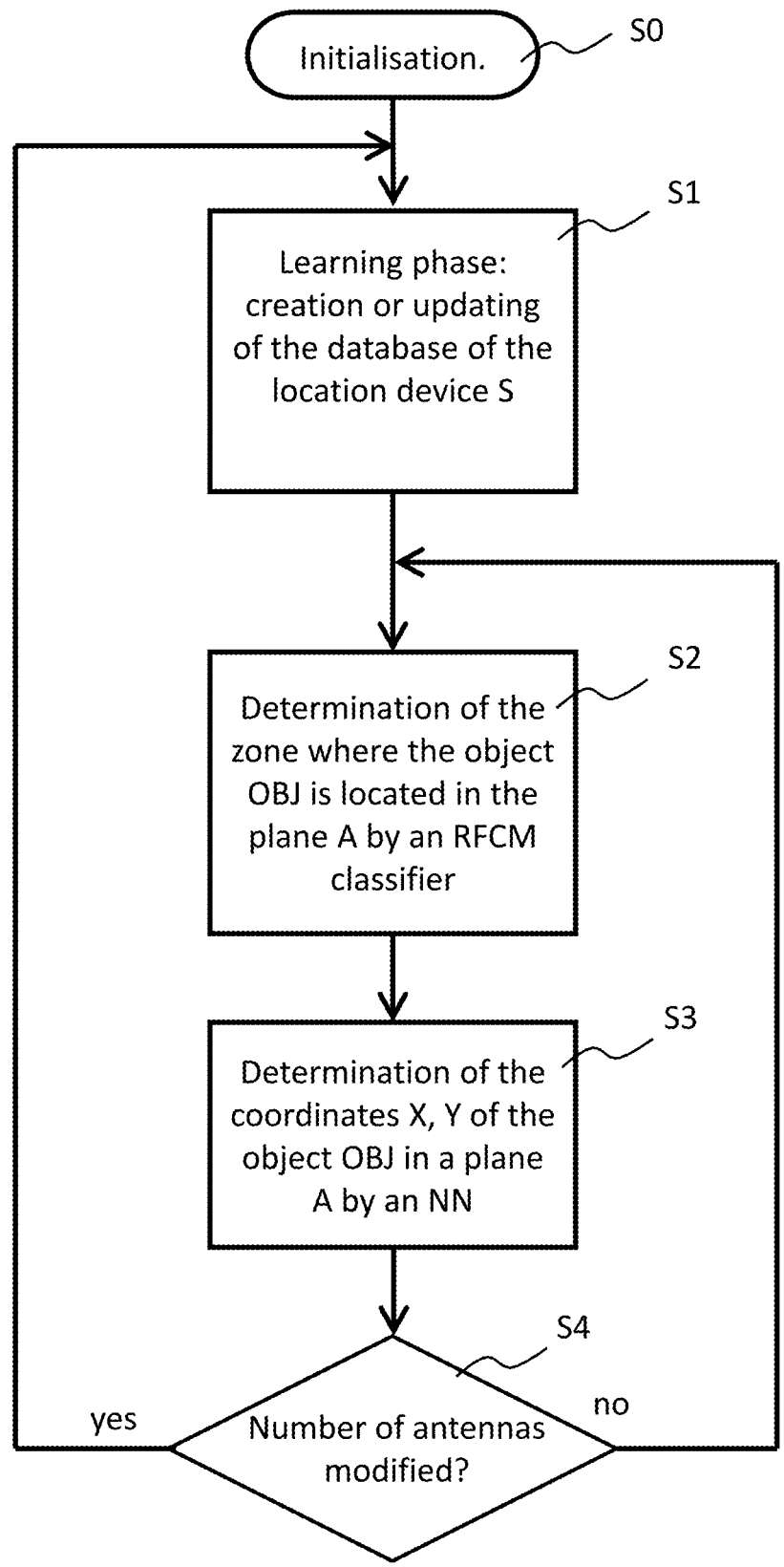
FIG. 6 is a flow diagram showing steps of the location method, according to one particular and non-limitative embodiment of the invention, executed in the location device shown in FIG. 1.

FIG. 6 is a flow diagram illustrating the method according to one embodiment of the invention.

An initialisation step S0 corresponds to a complete configuration of all the elements described so that these elements can operate conjointly. Thus, at the end of the step S0, the object or objects OBJ are configured to transmit radio signals to the antennas ANT1 to ANT6 of the telecommunications network N and the location device is initialised to proceed with a learning phase followed with one or more optional phases of location of an object OBJ in the plane A. The antennas ANT1 to ANT6 and the devices connected to each of the antennas are configured for receiving radio signals transmitted by one or more objects OBJ situated in the plane A. The location device S is configured to receive, from each of the devices connected to the antennas ANT1 to ANT6, one or more items of information representing the transmission between an object OBJ and an antenna among the antennas ANT1 to ANT6. Thus a device connected to an antenna is able to send, to the location device S, via the telecommunications network N, an RSS value and a TDOA value both representing the transmission of radio signals from an object OBJ situated at a position defined by its longitude X and its latitude Y, in the plane A. A learning phase is then implemented during a step S1. During this step, all the objects OBJ identifiable on the telecommunications network N and in the plane A, from information received by one or more antennas among the antennas ANT1 to ANT6, are the subject of one or more recordings in the database of the location device S. During this learning phase, the real positions of the objects during a recording are determined by a location device of the GPS type. According to a preferred embodiment of the invention, an object OBJ transmits its coordinates X and Y to the antennas disposed in the plane A. According to a variant of the embodiment, the coordinates X and Y are read during a measurement phase and recorded in the base manually or automatically, subsequently to the measurement. During this learning phase, so-called machine learning models are trained in the location device S. The term "machine learning" is to be interpreted here as a set of methods and statistics for learning from data. A first machine learning model is a classification model, also referred to as a classifier, which, from the RSS and TDOA values representing transmissions of radio signals emitted by the objects, makes it possible to determine, during a phase of location of an object OBJ, in which zone of the divided plane A this object is situated. To do this, the location device S comprises an RFCM classifier module implementing a classification algorithm. A second machine learning model used in the location device S implements a regression applied to a zone, making it possible to estimate the position of an object in the plane A, in the form of coordinates X and Y.

A criterion for the belonging of an object OBJ to a zone is defined by the first machine learning model. It is a fuzzy criterion. The output of the model is a probability of belonging to a zone, defined for each of the zones ZONE1 to ZONE6. The first model implements a classification algorithm of the RFC type (the abbreviation for "random forest classifier", and which means "decision-tree forest"). The decision tree forest algorithm performs a learning on multiple decision trees trained using slightly different subsets of data. According to the preferred embodiment of the invention, 400 trees are considered for this first model, and 8 samples minimum before the creation of a new tree. Furthermore, the maximum depth of a tree is 90. The second machine learning model used by the location device S is a neural network, also commonly referred to as NN. "Neural networks" means a graph of specific elementary objects for regression and supervised classification. The location device S implements as many recurrent neural networks NN as there are zones present in the plane A. Thus, if the division is made in accordance with the Voronoi algorithm, there are as many recurrent neural networks NN implemented in the location device S as there are antennas installed in the plane A. According to the example described, the location device S uses six NN. According to the preferred embodiment of the invention, each of the NNs is characterised by an input vector size and an output vector size and implements a dense layer composed of m neurones, m being a positive integer corresponding to half the sum of the size of the input vector and of the size of the output vector, the dense layer being fully connected, a dropout layer of 50% and an output layer of dimension two. According to a variant of the embodiment, the second model implements NNs using a multi-output regression model in order to predict the position of an object OBJ, in terms of coordinates X and Y in the plane A. This strategy consists of using two regression submodels, that is to say one for each of the targets X and Y. One submodel is then used for estimating the coordinate X of an object situated in the plane A, and the other submodel is used for estimating the coordinate Y of this same object in the plane A.

The learning phase executed at step S1 is adaptive and fluid. It can be re-executed when a new antenna is installed or commissioned or when an antenna is removed or is faulty. When the number of antennas is thus modified, a new division of the plane A must be performed before training of the two machine learning models using new data recorded in the database.

At the end of the learning phase, it is possible to locate any object OBJ, situated in the plane, using the location device S the supervised learning models of which have been trained. Cleverly and according to the invention, the location of an object OBJ in the plane by means of the location device S is achieved in two steps. The zone in which the object OBJ to be located is situated is first of all defined in a step S2 where the RFCM classifier executes the first machine learning model in order to obtain, for each of the six zones of the example described, a value indicating the probability of presence of the object OBJ in the zone. It is then considered that the object OBJ to be located is situated in the zone for which the highest probability of presence is determined.

The precise location of the object OBJ in the plane A, in terms of coordinates X and Y, is next performed in a second step S3 by executing the NN model, implemented by the location device S, and corresponding to the zone identified as comprising the object OBJ to be located. Advantageously, if two zones among the zones ZONE1 to ZONE6 have presence probability values of low discrimination, the two neural networks NN corresponding to the two zones are used and the mean of the two positions thus determined is calculated in order to determine the final coordinates X and Y in the plane A (that is to say the position of the object OBJ to be located).

According to a preferred embodiment of the invention, an object to be located is identified by the location device S by means of a unique identifier transmitted by the object OBJ to the antennas ANT1 to ANTE. The radio signals transmitted from an object OBJ encode information representing this object and optionally information representing the use thereof. For example, if the object OBJ is a smartphone, a unique identifier of the smartphone or a telephony service subscribed to is transmitted among the information encoded in the form of radio signals, in addition to information encoding the voice. The information is combined in the form of data frames, which can be processed subsequently by any device compatible with the communication network N and the location device S.

Thus, when the user of the location device S wishes to locate an object OBJ, it gives a unique identifier of the object OBJ by configuration of the location device S, so that all the data sent by the object OBJ thus identified can be analysed by the location device S. The devices respectively connected to the antennas ANT1 to ANT6 convert the radio signals received into data frames, which are then transmitted to the location device S. The location device S can be configured by any means conventionally used to do this, such as, for example, a user interface implemented by means of a terminal connected to the location device S, or integrated therein.

At the end of an operation of location of an object OBJ, it is checked whether the number of antennas used in the network is constant. This check is done by scrutinising frames that pass over the telecommunications network N. If the number of antennas varies, because of an addition or removal of an antenna, following a repair or when a fault occurs, for example, a new learning phase is implemented (return to the step S1). In the contrary case, a new operation of location of an object OBJ may be initiated (return to the step S2).

Figure 7:
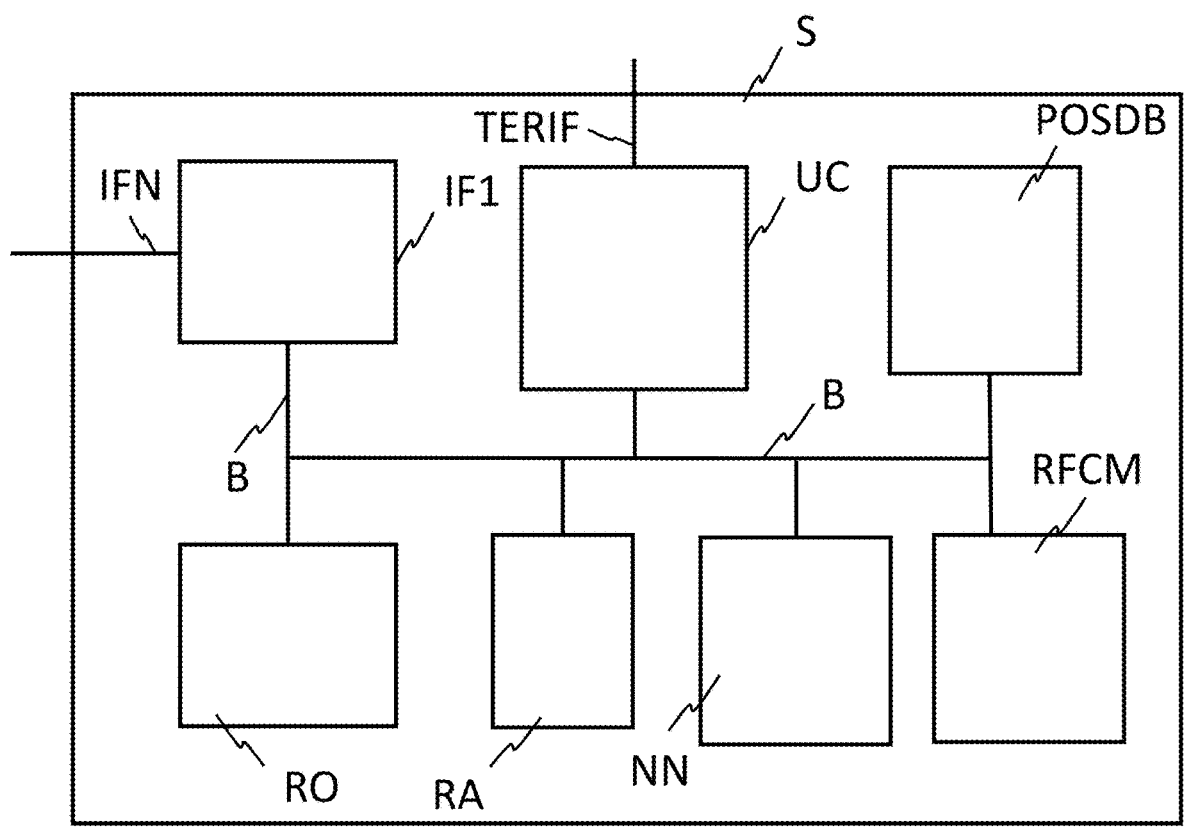
FIG. 7 is a schematic representation of the internal architecture of a device for locating an object according to a particular and non-limitative embodiment of the invention.

FIG. 7 illustrates the internal architecture of the device S for locating an object OBJ in the plane A, implementing the location method previously described. The location device S comprises a control unit UC, a non-volatile memory module RO for storing configuration parameters and executable software codes, a volatile memory module RA for executing software codes executable by the control unit UC, a memory module configured for implementing the database POSDB, a plurality of neural network modules NN, a classifier module RFCM and a network communication interface IF1 configured to be connected to the telecommunications network N by means of a connection port IFN. The communication interface IF1 is configured for a connection to a wide-area network and comprises an interconnection device of the bridge type. According to a variant embodiment, the interface IF1 may be of the wireless type and comprise an antenna system. The interface IF1 for connection to the telecommunications network 1 makes it possible to transfer data from and to the devices connected to each of the antennas ANT1 to ANT6. The internal modules of the location device S 100 are connected together by a common control/command/data bus B, managed by the control unit UC. The control unit UC further comprises an interface TERIF adapted for connecting an external configuration and display terminal, which comprises, for example, a screen and a keyboard. The location device S further comprises all the modules commonly used for the functioning of a control unit, such as, by way of example, a power supply source, a power supply interface circuit with supervision of the power supply lines, a reset circuit, one or more clock circuits, input/output ports, interrupt ports, and bus management buffers. This list not being exhaustive.

During a learning phase, the RSS and TDOA information, as well as the coordinates X and Y of an object OBJ in the plane A, representing a transmission Tij between this object OBJ positioned at a position POS-i on the plane A and an antenna ANTi among the antennas ANT1 to ANT6, are received by the interface IF1 connected to the telecommunications network N via the connection port IFN. This information is next recorded in the database module POSDB, under the control of the control unit UC. According to a variant of the embodiment, the coordinates X and Y corresponding to the positions that are the subject of a measurement for recording in the database POSDB are recorded subsequently, by means of a user interface, a memory card reader or any other means. When all the information has been entered in the form of samples in the database POSDB, the supervised-learning models or machine-learning model are trained under the control of the control unit CU, which executes the corresponding algorithms conjointly with the RFCM module for the classifier and the neural networks NM. The learning thus performed on a large number of input/output pairs makes it possible to have numerous RSS and TDOA values for a known position and to dispense with abnormal RSS and TDOA values or ones that are noisy because of the environment.

During a phase of geolocation of an object OBJ by the location device S, and after a user of the location device has given an identifier of the object OBJ to be located, the communication interface IF1 filters the information that is passing over the telecommunications network N and transmits all or some of the frames coming from the object OBJ to be located to the control unit UC, which analyses them and performs an extraction of the RSS and TDOA information coming from the object OBJ and intended for the various antennas ANT1 to ANT6. This information representing transmissions between the object OBJ to be located and the antennas ANT1 to ANT6 is transmitted to the RFCM classifier module, which performs a regression, using the data recorded in the database POSDB, so as to define values of probability of the presence of an object OBJ in each of the zones ZONE1 to ZONE6. The control unit UC next analyses these values and identifies the zone among the zones ZONE1 to ZONE6 for which the presence probability value is the highest among all the calculated values. The control unit next executes the algorithms of the neural network NN corresponding to this zone, in order to define the coordinates X and Y of the object in the plane A. These coordinates are then transmitted to the terminal connected to the interface TERIF, for display and/or recording. A new location procedure can then be initiated, for the same object OBJ, or a similar object OBJ, present in the plane A.

The invention is not limited solely to the embodiments described but to any method for locating an object in a plane, the method comprising a first phase known as the learning phase for informing a database, and a second phase known as the location phase, the location phase using a classifier operating using the database comprising information representing the transmission of signals between the object and reception antennas, in order to determine a probability of location of the object in the zones of the plane, the location phase further using a neural network, for determining, for the zone of the plane for which the probability of location is the highest, the position of the object in the form of coordinates in the plane. The invention also relates to a location device implementing the method as well as a computer program implementing the method and a storage device comprising such a program.

The invention claimed is:

1. A method for locating an object in a plane, the object transmitting radio signals to a plurality of reception antennas positioned in the plane, the reception antennas each being combined with a reception device configured to deliver at least one item of information representing the transmission of said signals from the object to said antenna, the method comprising:
   i) dividing the space into zones each comprising only one of the reception antennas,
   ii) recording, in a database, for each position among a plurality of known positions of the object in the plane, the at least one item of information representing the transmission of said signals from the object to each of the antennas, the position of the object in the form of coordinates in the plane, and an identifier of the zone,
   iii) training a neural network to determine a location of an object in each of the zones of the plane, from the information recorded in the database,
   iv) receiving radio signals from the object and through the plurality of antennas, and defining at least one item of information representing the transmission of signals from the object to each of the antennas,
   v) determining, by a classifier, from all the information representing the transmission of the signals between the object and each antenna, a probability of location of the object in each of the zones of the plane, vi) determining, by the neural network, for the zone for which the probability of location is the highest, the position of the object in the form of coordinates in the plane, wherein the division of the plane into zones is performed using a discrete set of points defined in the plane by the respective positions of the reception antennas.

2. The location method according to claim 1, the division of the plane into zones being performed in accordance with a Voronoi diagram.

3. The method according to claim 1, for which the classifier uses a statistical learning method using a decision-tree forest.

4. The method according to claim 1, used for locating an object connected to a telecommunications network.

5. The method according to claim 1, the definition of the position of the object in the form of coordinates in the plane performed at step ii) being established by a location device of the GPS type.

6. A non-transitory information storage medium embodying a computer program product, wherein the computer program product comprises program code instructions for performing the steps of the method according to claim 1, when said program is executed by a processor.

7. The method according to claim 1, further comprising between steps ii) and iv), a step of training said classifier to determine a probability of location of an object in each of the zones of the plane.

8. A device for locating an object in a plane, the object transmitting radio signals to a plurality of reception antennas positioned in the plane, the reception antennas each being positioned in a predefined zone of the plane containing a single antenna and the antennas each being combined with a reception device configured to deliver at least one item of information representingthe transmission of said signals from the object to said antenna, the location device comprising:

a database comprising, for each position among a plurality of known positions of the object in the plane, at least one item of information representingthe transmission of said signals from the object to each of the antennas, the position of the object in the form of coordinates (X, Y) in the plane, and an identifier of a zone comprising said position among a plurality of zones of the plane, a reception interface configured to receive at least one item of information representingthe transmission of signals from the object to each of the antennas in the plurality of antennas, a classifier configured to determine, from all the information representing the transmission of the signals between the object and each antenna, a probability of location of the object in each of the zones of the plane, a neural network for determining, for the zone for which the probability of location of the object is the highest, the position of the object in the form of coordinates in the plane, wherein the plane is divided into zones by using a discrete set of points defined in the plane by the respective positions of the reception antennas.

9. The location device according to claim 8, the classifier being configured to implement a statistical learning method using a decision-tree forest.

* * * * *